United States Patent [19]

Eshelman et al.

[11] 4,161,886

[45] Jul. 24, 1979

[54] PRESSURE TRANSDUCER AND METHOD

[75] Inventors: Robert W. Eshelman, Ann Arbor; Frederick W. Crall, Farmington Hills, both of Mich.

[73] Assignee: Chrysler Corporation, Highland Park, Mich.

[21] Appl. No.: 897,890

[22] Filed: Apr. 19, 1978

[51] Int. Cl.² ............................ G01L 9/10; G01L 9/14
[52] U.S. Cl. ...................................... 73/722; 29/451; 29/602 R; 73/728; 73/729
[58] Field of Search ................. 73/728, 722, 386, 387, 73/729, 727; 336/30; 29/451, 602 R

[56] References Cited

U.S. PATENT DOCUMENTS 3,800,259  3/1974  Moulds et al. ........................ 336/30
3,884,079  5/1975  Turtle et al. ............................ 73/722

OTHER PUBLICATIONS

Publication entitled "Altitude Sensor Proposal", Hall, Ranco Controls Division, 4/19/77.

Primary Examiner—Donald O. Woodiel
Attorney, Agent, or Firm—Baldwin & Newtson

[57] ABSTRACT

A pressure transducer comprises a series-connected helical coil spring and bellows assembled into the bore of a housing by anchoring the spring and bellows at locations which place them in a state of tension. Expansion and contraction of the bellows reacts against the spring and correspondingly positions a ferrite slug within an inductance coil to cause the inductance thereof to be a function of the pressure differential acting on the bellows. One end of the coil spring is threaded onto a threaded fitting secured to one end of the bellows, and slope calibration of the transducer is accomplished by setting the amount of engagement of the spring with the threaded fitting. Offset calibration can be performed by either of two disclosed techniques, and the offset and slope calibrations can be independently made.

6 Claims, 14 Drawing Figures

PRESSURE TRANSDUCER AND METHOD

BACKGROUND AND SUMMARY OF THE INVENTION

This invention pertains to pressure transducers and methods of assembly and calibration of pressure transducers.

Pressure transducers are used in various types of applications. One application in the automotive field where a pressure transducer is used is in an engine fuel control system where the transducer senses barometric pressure and provides a corresponding electrical signal for use by the engine control system in correcting volumetric fuel delivery for variations in atmospheric presure. A specific example of such an application is an electronic fuel metering system of the type disclosed in U.S. Pat. No. 3,935,851, assigned to the same assignee as the present application. Another example of usage for a pressure transducer in the automotive field is sensing engine intake manifold vacuum and providing a corresponding signal for use by an electronic control, such as an electronic spark timing control.

An undesirable feature of prior pressure transducers which have been produced for the automotive industry is that such transducers are relatively high cost devices. Typical prior devices incorporate such structure as linear variable differential transformers, silicon strain gages and capacitancetype sensors. There are a number of reasons for such inherent high manufacturing costs. For one, temperature compensation is difficult to obtain without going to fairly sophisticated electronic control. For another, the motion produced by transducers which use a diaphragm-type aneroid is relatively small, and this makes dimensional tolerances very critical. Further, control of the rate and offset calibrations of these devices has typically been done by very careful control of the aneroid assembly which is a relatively expensive manufacturing process.

In contrast, the present invention is directed to a new and unique pressure transducer which overcomes the foregoing disadvantages of prior devices. As a result, a pressure transducer embodying principles of the present invention affords the opportunity for reduced manufacturing cost while retaining the required degree of accuracy. The transducer has a sensing element which exhibits a comparatively large amount of motion over its operating range, a feature which is beneficial in minimizing the adverse effects of dimensional tolerance variations in the structure of the transducer. The invention also employs a new and unique means for adjusting and calibrating a pressure transducer with expediency and accuracy. An advantage of the invention is that it can reduce inaccuracies caused by temperature changes. An additional advantage is that the transducer has no levers or pivots which tend to introduce hysteresis.

The foregoing features and advantages and benefits of the present invention, along with additional ones, will be seen in the ensuing description and claims which are to be considered in conjunction with the accompanying drawings which disclose an exemplary but presently preferred embodiment of pressure transducer embodying principles of the present invention according to the best mode presently contemplated in carrying out the invention.

DESCRIPTION OF THE PREFERRED EMBODIMENT

Figure 1:
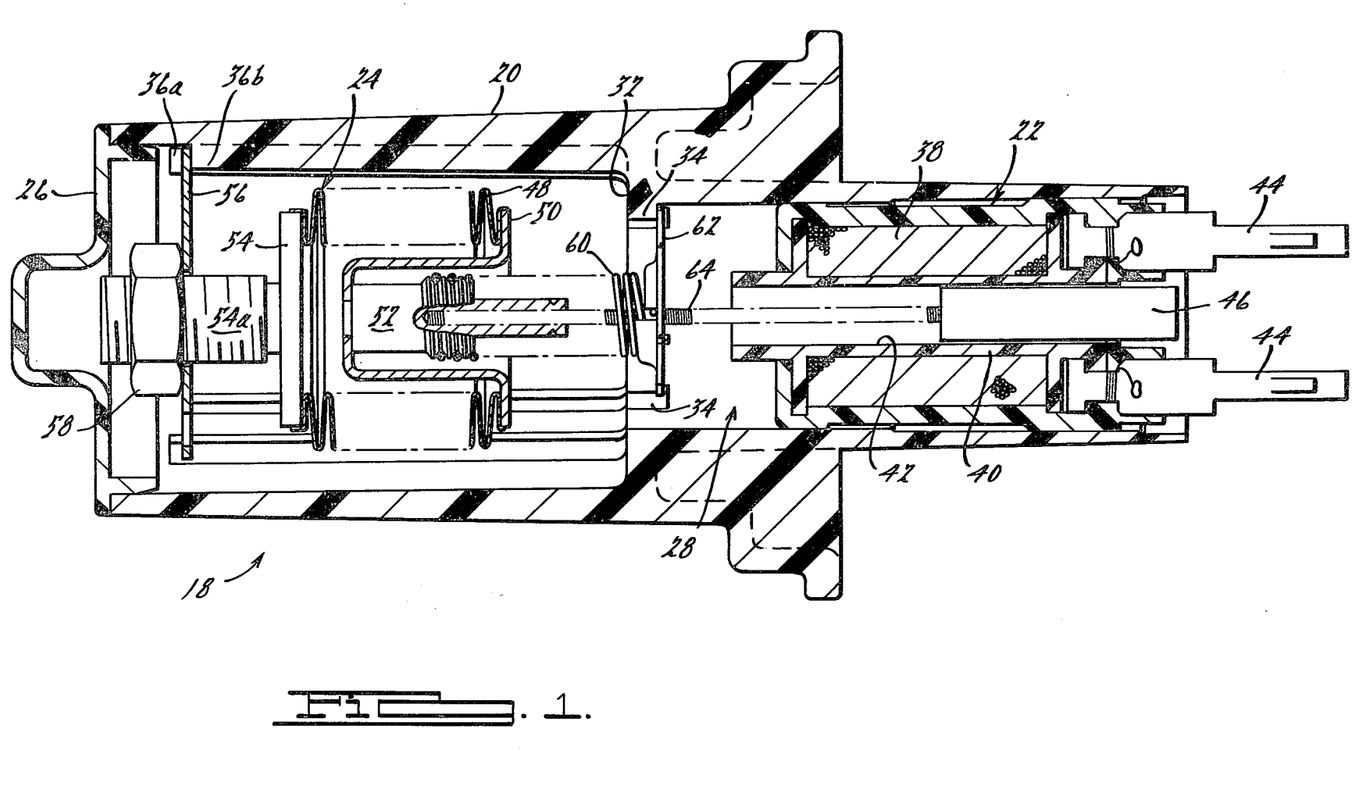
FIG. 1 is a longitudinal sectional view through a pressure transducer of the present invention.
Figure 2:
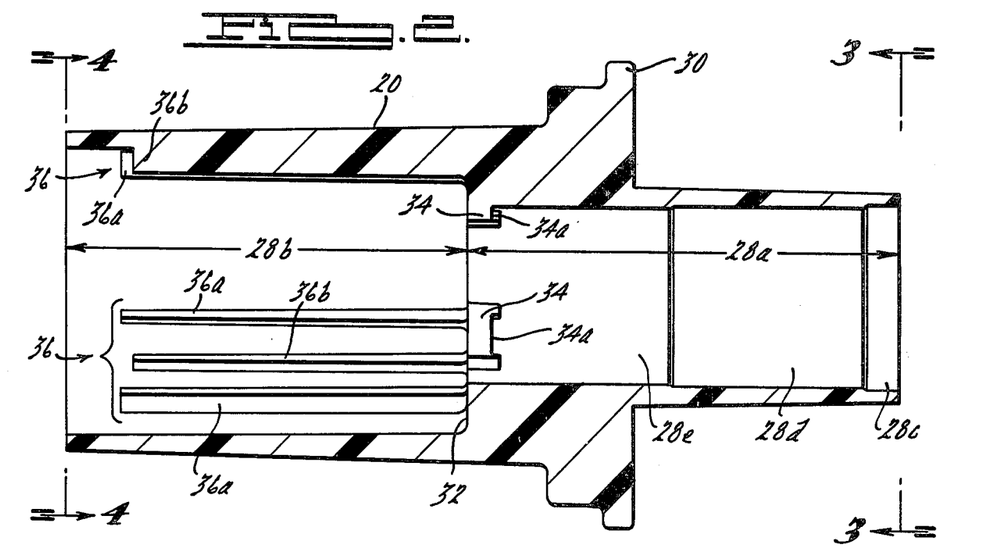
FIG. 2 is a longitudinal sectional view, on a slightly reduced scale, of one element of the transducer of FIG. 1 shown by itself.

As shown in FIG. 1, the pressure transducer 18 of the present invention comprises a housing 20, an inductance coil unit 22, a pressure-responsive mechanism 24, and a cover, or end cap, 26. Briefly, housing 20 is of generally tubular shape comprising a throughbore designated generally by the numeral 28. Inductance coil unit 22 is disposed within the right-hand portion of throughbore 28, a viewed in FIG. 1, and pressure-responsive mechanism 24 is disposed within the left-hand portion of the throughbore. Coil unit 22 serves to close the right-hand end of the throughbore while the left-hand end of the throughbore is closed by cover 26. As will be explained more fully hereinafter, pressure-responsive mechanism 24 is operatively coupled with coil unit 22 such that the inductance of the coil unit is caused to vary as a function of a pressure differential sensed by the pressure responsive mechanism.

Details of housing 20 are best seen in FIGS. 2 through 5. Housing 20 is preferably a molded plastic element which may be fabricated according to conventional molding techniques using conventional materials. A mounting flange 30 of the type shown in U.S. Pat. No. 4,055,886, assigned to the same assignee of the present application, is provided on the outside of the tubular housing wall. Throughbore 28 may be considered to comprise a right-hand bore section 28a and a left-hand bore section 28b. (All references to right-hand and left-hand refer to the views as appearing in FIGS. 1 and 2.) The right-hand bore section 28a comprises three bore sections of successively slightly reduced diameter from the open right-hand end of the housing. These three segments are designated 28c, 28d and 28e respectively. Inductance coil unit 22 is intended to be disposed in the right-hand bore section 28a by inserting the coil unit into the open right-hand end. Positioning of coil unit 22 axially within bore 28 is an important step in the preferred method of securing the correct calibration of the pressure transducer. The disclosed design of the right-hand bore section 28a, in conjunction with the design of inductance coil unit 22, is intended to provide controlled, precise, axial lodging of the coil unit within the bore section. Details of this method of lodging the inductance coil unit within the bore are disclosed in the last aforementioned U.S. Patent and will not be repeated here in the interest of brevity.

Figures 3, 4, 5:
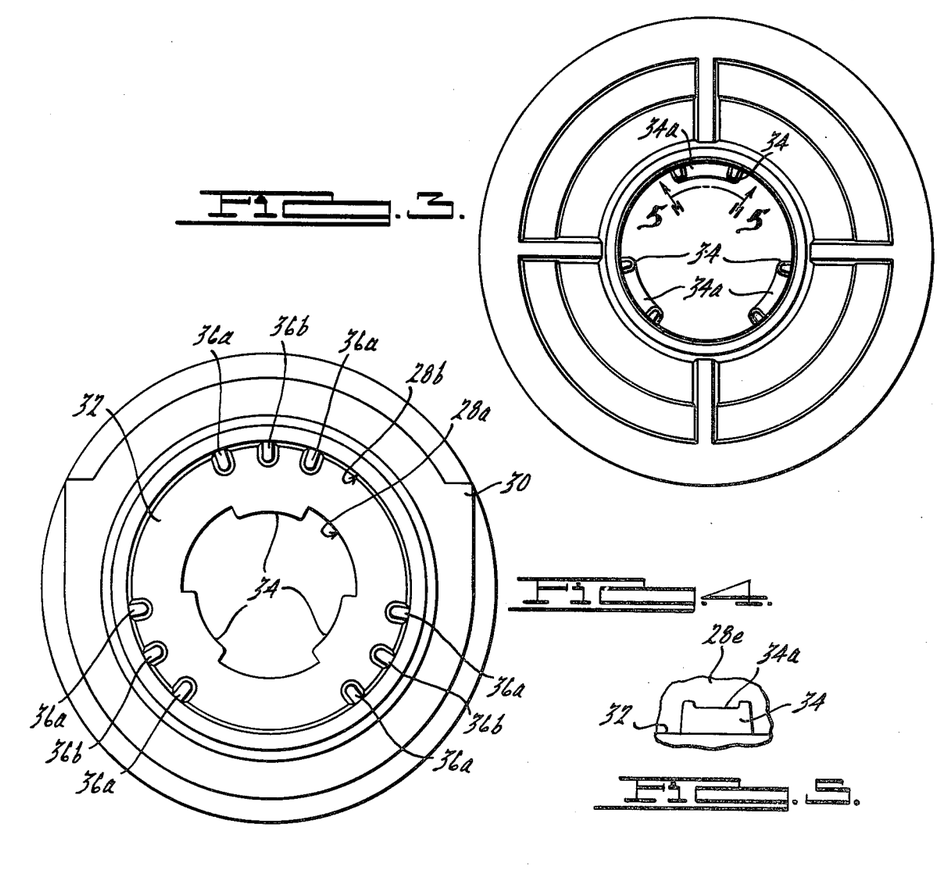
FIG. 3 is a view taken in the direction of arrows 3—3 in FIG. 2.
FIG. 4 is a view taken in the direction of arrows 4—4 of FIG. 2.
FIG. 5 is a fragmentary view taken in the direction of arrows 5—5 in FIG. 3.

The right-hand and left-hand bore sections 28a, 28b join at a shoulder 32 at a point approximately half-way along the length of housing 20. Disposed on the wall of bore section 28a at shoulder 32 is a set of three bosses each of which is designated by the numeral 34. As best seen in FIG. 3 each boss 34 has a certain arcuate extent and the three bosses are equally arcuately spaced around the wall of the bore. Each boss 34 includes a recess 34a in the right-hand face thereof. As will become apparent from subsequent description, bosses 34 cooperate with pressure-responsive mechanism 24 in assembly of the latter into the housing.

Structure is also provided on the wall of left-hand bore section 28b whose purpose is in certain respects similar to that provided by bosses 34. This structure comprises three sets of longitudinal ribs, each set being designated by the reference numeral 36 and consisting of three individual ribs. Like each boss 34, each rib set 36 is of a certain angular extent, and the three sets are equally circumferentially disposed around the wall of the bore section. Each set 36 comprises two outer ribs 36a between which is disposed an inner rib 36b. The ribs 36a, 36b extend from shoulder 32 lengthwise toward the left of bore section 28b and stop slightly short of the end of the housing. The outer ribs 36a are of the same length while the inner rib 36b is of slightly shorter length. In this way, the left-hand end of each rib set forms a shape defining a recess which is similar to the recess 34a associated with each boss 34. The three sets 36 are utilized in the assembly of pressure-responsive mechanism 24 into the housing, as will be seen in the ensuing description.

Having thus described details of housing 20, attention can now be directed to further consideration of inductance coil unit 22, as viewed in FIG. 1. Coil unit 22 is like that disclosed in the above last-mentioned U.S. patent, and thus details will not be explained here in the interest of brevity. Suffice it to say that the inductance coil unit comprises an inductance coil element 38 which is disposed on a plastic bobbin 40 having a bore 42. The ends of the coil element 38 are electrically joined to corresponding electrical terminals 44 which extend from the right-hand end of the housing and provide for connection of the coil element in an external electrical circuit. The inductance coil unit is assembled into housing 20 by first inserting the left-hand end of the coil unit into the open right-hand end of throughbore 28. The coil is then more fully inserted into the bore until brought to the desired axial position such as shown in FIG. 1. It will be noted that bore 42 of coil unit 22 is coaxial with the housing throughbore and that the left-hand end of bore 42 is open. This is so that a cylindrical ferrite core element 46, which is a part of pressure-responsive mechanism 24, can slide into bore 42 during assembly of the transducer. As will be seen, this core element 46 is displaced axially within bore 42 by pressure-responsive mechanism 24 in response to change in pressure differential sensed by the pressure-responsive mechanism.

Figure 6:
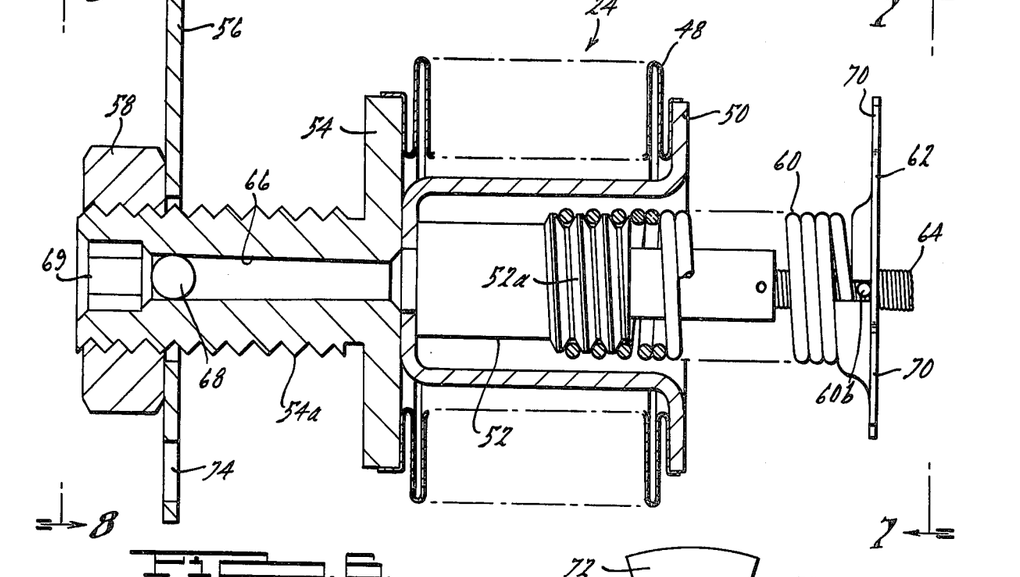
FIG. 6 is a longitudinal sectional view of certain elements of the transducer of FIG. 1, on a slightly enlarged scale, assembled together and is useful in explaining the method of assembly of the transducer of FIG. 1.

Attention is next directed to consideration of the details of pressure-responsive mechanism 24 which is substantially shown by itself in FIG. 6. The disclosed mechanism comprises a bellows 48, an adjusting screw cup 50, an adjusting screw fitting 52, a calibration screw fitting 54, a retainer plate 56, a nut 58, a helical coil spring 60, a spring anchor 62, and a connecting element 64 which connects to core element 46, the latter having been broken away in FIG. 6. The left-hand end of fitting 52 fits within cup 50 and is secured in any suitable manner to the left-hand wall of the cup. The right-hand end of cup 50 includes an out-turned circular flange which mates with and is suitably joined and sealed to the right-hand end of bellows 48. The right-hand end of calibration screw 54 includes a circular flange which mates with and is suitably joined and sealed to the left-hand end of bellows 48. Fitting 54 includes a threaded shank 54a on which retainer plate 56 is disposed with a slightly loose fit. Nut 58 is threaded onto the free end of shank 54a to keep retainer plate 56 thereon. The preferred embodiment is intended to be used as a barometric pressure transducer, and thus bellows 48 will be evacuated to a certain vacuum and the exterior exposed to ambient atmosphere. With the right-hand end of bellows 48 being sealed by cup 50 and left-hand end being sealed by fitting 54, provision is made for evacuating the interior of the bellows by providing an axial throughbore 66, preferably slightly tapered, in fitting 54. Once a suitable degree of evacuation has been attained, throughbore 66 is closed and sealed by lodging a suitable sealing plug 68 therein as shown. Fitting 52 includes a threaded section 52a onto which the left-hand end of coil spring 60 is threaded. The amount of engagement of the coil spring with thread 52a may be adjusted by rotating the spring and the fitting relative to each other. As will be seen, this is how a portion of the calibration procedure is done. The pitch of thread 52a is made at least equal to, and preferably slightly greater than, the lead of the helix defining spring 60. By making the thread pitch slightly greater than the lead of the helix, those coils of the spring which are engaged with thread 52a are slightly tensioned on the thread so that once the amount of engagement has been set, it should not change during the use of the transducer. The stem which forms the right-hand end of fitting 52 includes a bore into which the left-hand end of connecting element 64 is inserted. The connecting element and the fitting are securely joined by any suitable means, for example, by crimping the end of the stem to the element after it has been inserted a desired distance into the bore. The right-hand end of connecting element is secured in a suitable manner to core element 46, for example, by using a suitable cement. Connecting element 64 is preferably an elongated, tightly wound helical coil to provide a certain flexibility which tends to compensate for any misalignment between bore 42 of the coil unit relative to pressure responsive mechanism 24. Spring anchor 62 is threaded onto the right-hand end of spring 60. In order to accomplish this, the central region of spring anchor 62 is formed into a single turn female thread having the same pitch as the lead of the spring helix. A radial slot 62a is also provided in spring anchor 62. The right-hand end of spring 60 terminates in a tail 60b which is passed through slot 62a to initiate assembly of the spring to anchor. The slot is circumferentially disposed relative to the beginning of the single female thread such that once tail 60b has been thusly passed through slot 62a, the spring and spring anchor can be relatively rotated to cause the first turn of the spring to thread onto the single thread of the spring anchor. It thusly initiating the assembly, a tension is imparted to the tail and the first turn of the spring which, when one complete revolution has been made, causes the tail to snap back into engagement with the edge of slot 62a and circumferentially lock the two pieces.

Having therefore described in some detail the construction of transducer 18, attention is redirected to FIG. 1 which shows the assembled transducer. The method of how the transducer is assembled will be explained in greater detail later. In the assembled transducer the right-hand end of spring 60 is anchored within the housing throughbore by engagement of spring anchor 62 with the bosses 34 in a manner which will be explained later in connection with the description of the assembly method. Both spring 60 and bellows 48 are placed in tension by anchoring retainer plate 56 within the housing throughbore on the rib sets 36 in a manner also to be explained later. Such tension is achieved by making the axial dimension between the two anchoring points on the housing greater than the axial distance between retainer plate 56 and spring anchor 62 when mechanism 24 is in the relaxed position shown in FIG. 6. With the pressure-responsive mechanism mounted in this manner, changes in pressure differential acting on bellows 48 will cause the bellows to expand and contract in length with spring 60 experiencing corresponding contraction and expansion in length. Because the left-hand end of the bellows is thus positioned relative to the housing, the expansion and contraction of the bellows causes the right-hand end of the bellows to move in a corresponding amount axially within the housing. This motion is in turn transmitted via cup 50, fitting 52, connecting element 64 to effect a like displacement of core element 46 within bore 42 of inductance coil unit 22. Thus, the inductance which appears between the terminals 44 is made a function of the pressure differential acting on the bellows. When there is a minimum pressure differential, the bellows will expand to maximum length and core element 46 will be displaced maximally to the right as viewed in FIG. 1. Similarly, when there is maximum pressure differential the bellows will contract to minimum length and the core 46 will be displaced maximally to the left. For pressure differentials between these extremes, the core assumes corresponding positions intermediate its right-hand and left-hand limits of travel.

A significant feature of the invention relates to the facility, expediency and accuracy with which the transducer can be calibrated. Therefore, a brief background explanation of calibration criteria is in order. In order for a pressure transducer to be properly calibrated it is necessary that two separate and independent calibrations be made. One calibration is often referred to as the set point, or offset, calibration and the other is often referred to as the slope, or rate, calibration. The purpose of the slope calibration is to cause the output of transducer to change at a rate which is calibrated with respect to the rate at which the input to the transducer changes. The purpose of the set point calibration is to cause the output to have a particular value for a given value of the input.

In the disclosed pressure transducer, the slope calibration means that the rate of change of inductance must be calibrated to the rate of change of the ambient pressure to which the bellows is exposed. As the reader will understand from the foregoing description, expansion of the bellows will reduce the tension on the coil spring while contraction will increase the tension. Thus, it can be appreciated that the amount of change in the length of the bellows, for a given change in pressure acting on the bellows, will be directly related to the spring tension. The spring tension in turn is a function of the spring characteristics. One aspect of the present invention affords a quick and easy way of performing slope calibration in the assembled transducer. Because the right-hand end of spring 60 is constrained against rotational displacement relative to the housing, rotation of fitting 52 will serve to set the number of active turns of the coil spring. Rotation of the fitting is accomplished by rotating calibration screw 54, the rotation being imparted to fitting 52 by the assembly of the components 54, 48, 50 and 52 together. The threads of fitting 54 and of fitting 52 are selected in such a ratio as to preclude axial displacement of core element 46 with respect to the inductance coil unit when the calibration screw is actuated. As shown in FIG. 6, the left-hand end of calibration screw fitting 54 is provided with a suitable socket 69 which may be engaged by a corresponding adjustment tool to rotate the calibration screw in performing the slope calibration.

The set point calibration is preferably accomplished by precisely axially locating inductance coil unit 22 within bore section 28a during the assembly procedure into the housing, as briefly mentioned above. Once the inductance coil unit has been set to the desired axial location it can be suitably joined to the housing by any suitable means, as by ultrasonic welding, fastening, etc. A further feature should be noted in that it is possible to calibrate the set point by means of nut 58 even after inductance coil unit 22 has been joined to the housing. By rotating nut 58 on calibration screw 54, the latter is displaced axially to similarly displace core element 46 axially via bellows 48, cup 50, fitting 52 and connecting element 64.

Figures 7, 8:
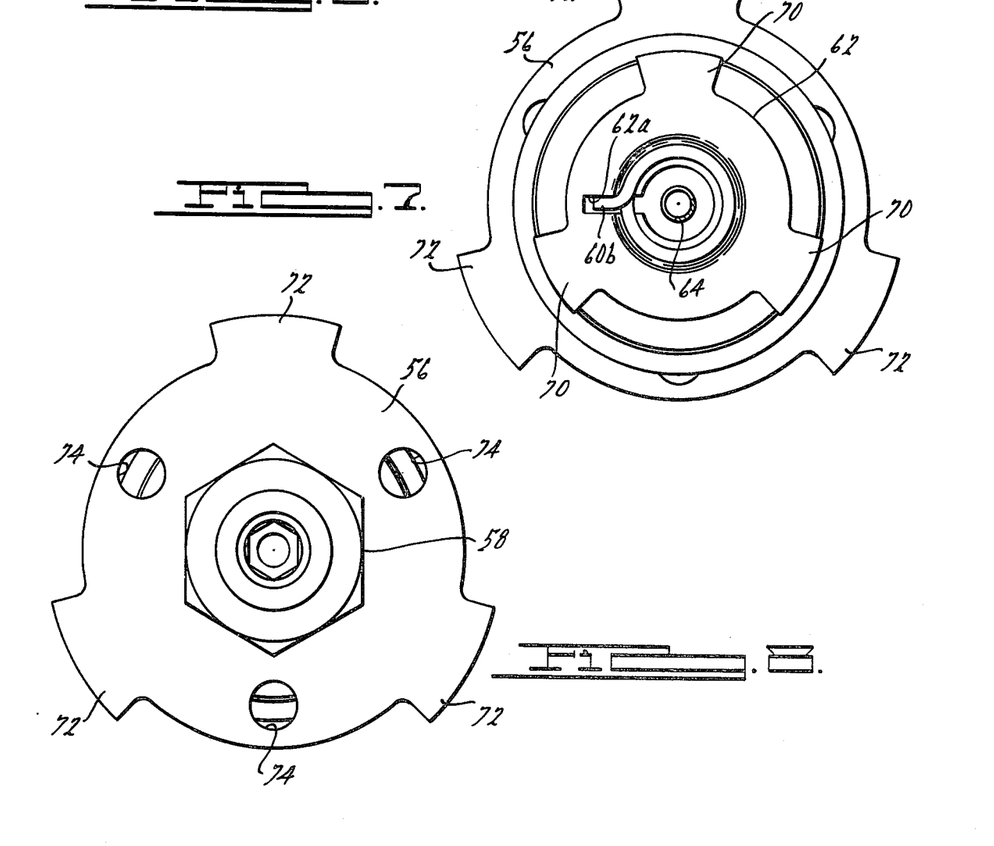
FIG. 7 is a view taken in the direction of arrows 7—7 in FIG. 6.
FIG. 8 is a view taken in the direction of arrows 8—8 in FIG. 6.

Having therefore described the assembled transducer and calibration thereof, it is now appropriate to consider the method by which the various elements of the transducer are assembled. While the preferred sequence of assembly steps will be described, it will be appreciated that other sequences are possible. The first step is to assemble together the elements constituting what has been referred to as the pressure-responsive mechanism 24. A preset number of turns of coil spring 60 are engaged with thread 52a of fitting 52. Similarly, nut 58 is threaded onto the shank 54 a predetermined number of turns. The right-hand end of the pressure responsive mechanism is inserted into the open left-hand end of housing 20. As best shown perhaps in FIG. 7, spring anchor 62 comprises three identical radially outwardly directed arcuate tabs 70 whose radially outer edges lie on a circle whose diameter is slightly less than the diameter of bore section 28e. The segments of spring anchor 62 which lie between tabs 70 are disposed on a circle whose diameter is slightly less than the diameter of the circle defined by the radially inner peripheries of the three bosses 34. The arcuate extent of each tab 70 is less than the arcuate extent of each arcuate space between bosses 34. Thus, when the mechanism 24 is inserted far enough into the housing to reach shoulder 32, the spring anchor cannot be inserted past bosses 34 unless the spring anchor is circumferentially oriented relative to the bosses 34 to a position where tabs 70 register with the arcuate spaces between the bosses. Thus, the bosses 34 act as a key which requires proper circumferential orientation of the spring anchor relative to the housing before the spring anchor can be displaced beyond the bosses. However, it should be pointed out that during insertion, retainer plate 56 will reach the left-hand end of the three rib sets 36 before spring anchor 62 reaches shoulder 32. Retainer plate 56 is similar in design to spring anchor 62 in that it comprises three radially outwardly directed tabs 72 whose radially outer edges lie on a circle whose diameter is slightly less than the diameter of bore section 28b. The arcuate segments of the retainer plate between tabs 72 are disposed on a circle whose diameter is slightly less than the diameter of a circle defined by the radially inner peripheries of the ribs 36a, 36b of the three rib sets 36. The arcuate extent of each tab 72 is less than the arcuate extent of each space between rib sets 36. Thus, tabs 72 must register with the arcuate spaces intermediate the three rib sets 36 before the retainer plate can be disposed within the housing bore beyond the left-hand ends of the rib sets 36. Because the retainer plate is loosely mounted on the shank of element 54 the retainer plate can be rotated by itself to properly locate tabs 72 so that further insertion of mechanism 24 can be accomplished to bring spring anchor to shoulder 32.

Figure 9:
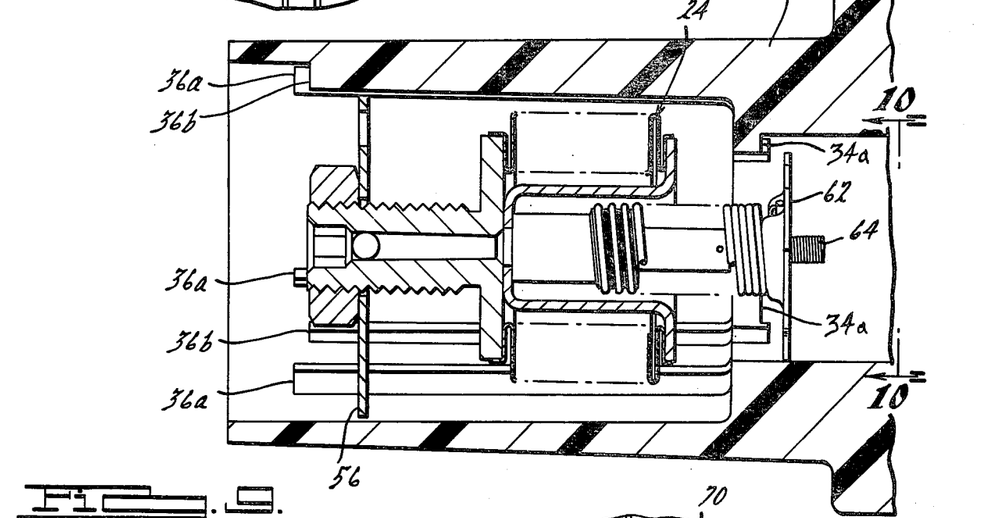
FIG. 9 is a fragmentary longitudinal sectional view of the transducer of FIG. 1 useful in explaining the method of assembly.
Figure 10:
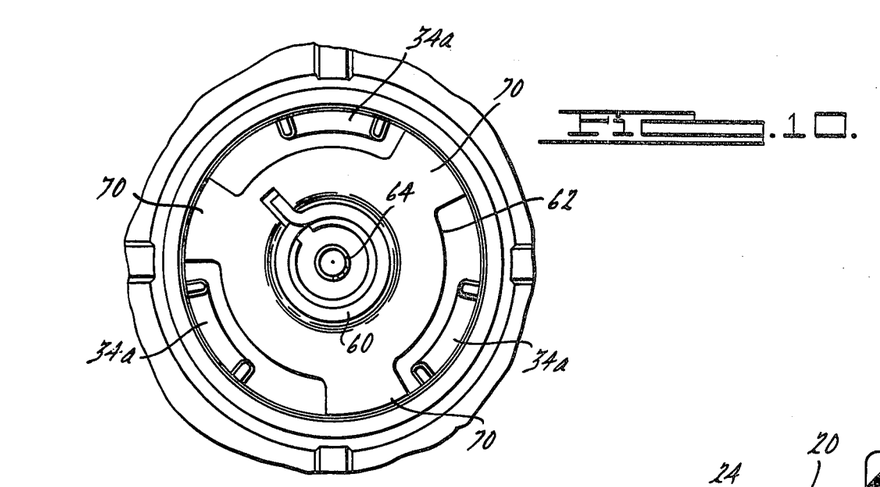
FIG. 10 is a view, on a slightly enlarged scale, taken in the direction of arrows 10—10 in FIG. 9.
Figure 11:
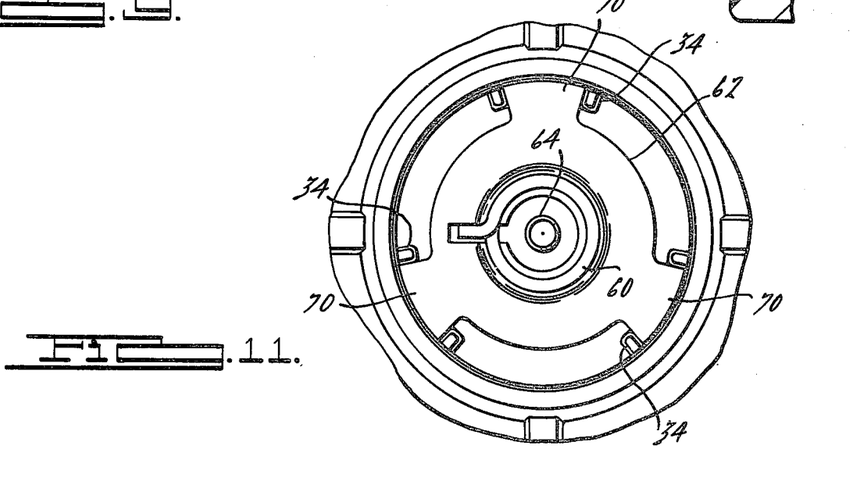
FIG. 11 is a view similar to FIG. 10 illustrating a further step of the assembly method.
Figures 12, 13, 14:
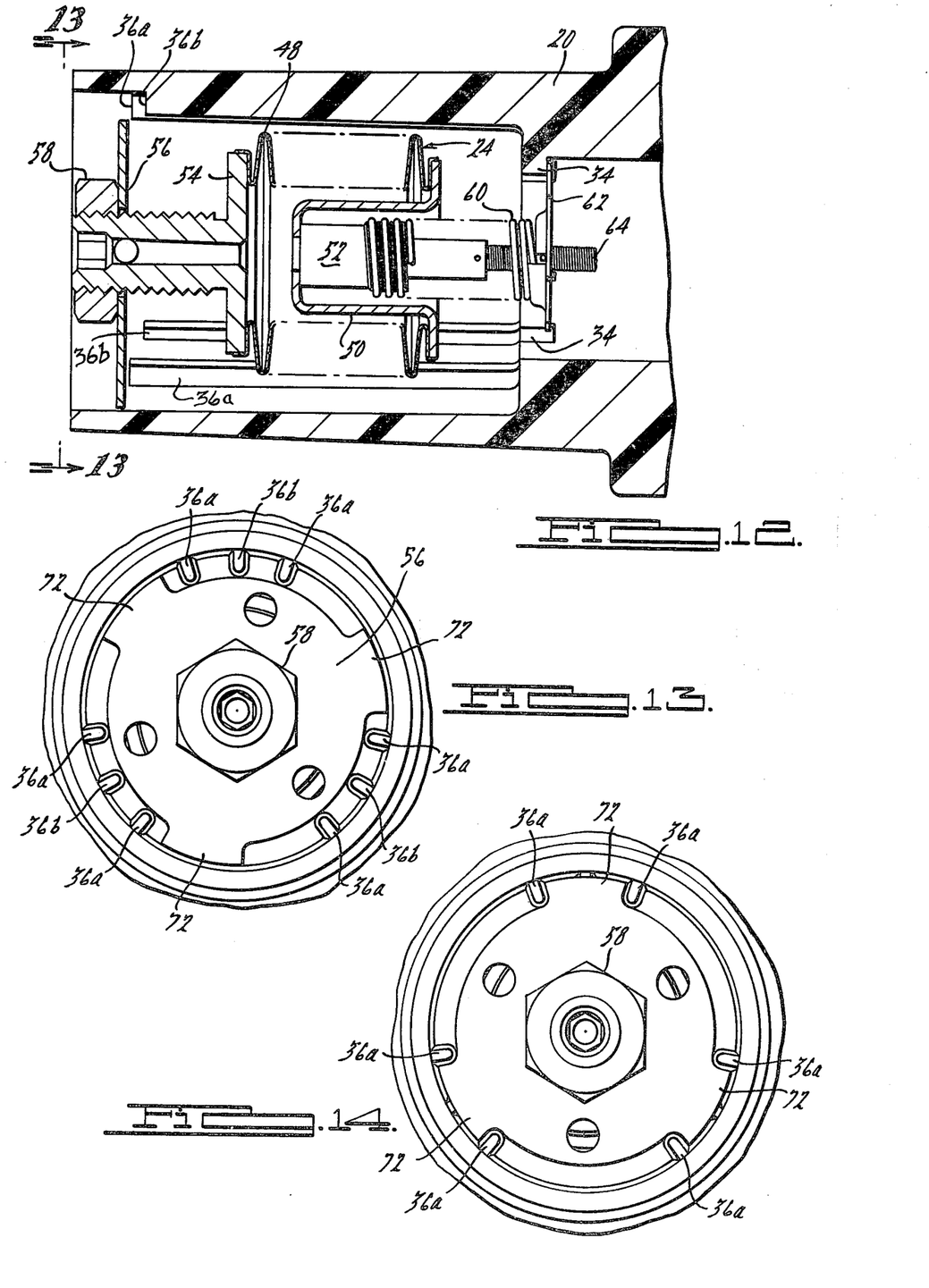
FIG. 12 is a view similar to FIG. 9 illustrating a still further step of the assembly method.
FIG. 13 is a view taken in the direction of arrows 13—13 in FIG. 12.
FIG. 14 is a view similar to FIG. 13 illustrating a still further step of the assembly method.

Tabs 70 having thus been suitably keyed with respect to bosses 34, it is now possible to more fully insert mechanism 24 to the position shown in FIG. 9 where spring anchor 62 is disposed to the right beyond bosses 34. Note the position of the spring anchor relative to bosses 34 at this time in an axial end view looking into the right-hand end of the housing bore. Now, fitting 54 is rotated in either direction to bring tabs 70 to the position shown in FIG. 11 wherein tabs 70 register with recesses 34a of bosses 34. As element 54 rotates, tabs 72 of retainer plates 56 remain disposed in the spaces between the rib sets 36 and the retainer plate does not interfere with rotation of the spring anchor. Next, the mechanism is drawn toward the left as viewed in FIG. 9 to cause tabs 70 to lodge in the respective recesses 34a. As shown there is preferably a close circumferential fit of the tabs in the recesses. Once such lodgement has occurred, continued displacement of the mechanism toward the left will cause the bellows and the spring to come under increasing tension. Such displacement can be accomplished by means of a suitable tool engaging retainer plate 56, holes 74 being provided so that the tool can engage the plate thereby. Displacement is continued until the retainer plate is disposed in the position illustrated in FIG. 12 wherein the retainer plate clears the left-hand ends of the three rib sets 36. The relative circumferential orientation of retainer plate 56 with respect to the housing at this time is shown in FIG. 13. Next the retainer plate is rotated by itself to register tabs 72 with the respective rib sets 36. This is shown in FIG. 14. The tool is now released with the spring tension which has been imparted to mechanism 24 serving to lodge tabs 72 in the receptacles provided by the shape of each rib set at the left-hand ends thereof. This completes the assembly of mechanism 24 to housing 20 whereby the transducer assumes the position shown in FIG. 1 with the bellows and the spring under tension. Coil unit 22 is now assembled into housing 20 in the manner set forth above. The assembly is completed by inserting end cap 26 onto the left-hand end of the housing.

In reference to the possibility of alternate steps in the assembly sequence, it should be pointed out that it is possible to calibrate the set point of the transducer by means of nut 56 alone. This would permit core unit 22 to be assembled in the housing 20 before mechanism 24. Precise location of the coil unit would not necessarily be required. After the pressure responsive mechanism has been assembled, nut 56 can be adjusted to thereby position core 46 within the bore of coil unit 22 to yield the desired set point inductance.

It should be pointed out that the preferred embodiment as disclosed provides two separate and independent means of performing the set point calibration, one being by the precise axial lodging of coil unit 22 within the housing after pressure responsive mechanism 24 has been assembled to the housing and two, by utilizing the adjustment calibration capability of nut 56. If the transducer set point is calibrated only by the former method it would be possible to eliminate nut 56 and substitute any type of equivalent arrangement which would provide for the anchoring of the left-hand end of the bellows relative to the housing. However, even if the adjustment capability of the invention is never intended to be used, the disclosed structure is preferred because it is easy and economical to manufacture.

The present invention provides a number of important advantages over prior pressure transducers. For one, the transducer of the present invention can be manufactured at relatively low cost which is important in mass production usage such as in the automotive field. The coaxial arrangement of the component parts provides minimum friction and hysteresis during operation. Temperature compensation can be accomplished to minimize the inaccuracies which arise because of temperature change. One form of temperature compensation can be made by back-filling of bellows 48 to compensate for the temperature coefficient variable of the coil. The core rod and the housing can be made of materials having different coefficients of expansion and produce a compensating factor to offset temperature-caused expansion or contraction of the bellows. It should also be noted that the nesting arrangement of bellows 48, cup 50, fitting 52 and the connecting element tends to make the transducer compact in the axial direction.

The invention permits the use of standard commercial grade bellows and springs. For example such a bellows 48 typically possesses a ±20% tolerance in its spring rate, and spring 60, a ±5% tolerance. Yet because of the invention, the resultant spring rate of mechanism 24 is expected to exhibit a ±1% tolerance. Coil unit 22 exhibits a highly linear inductance vs. core displacement characteristic for the typical bellows travel of 0.200 inches. Thus, the invention meets accuracy requirements without the use of costly component parts and expensive assembly and calibration techniques. Another advantage is that no internal bellows spring is required because the rate of spring 60 can be chosen to keep the bellows from bottoming out and yet still take advantage of the full 0.200 inches travel. By not needing such an internal spring, extra cost is avoided and increases in the diameter of the transducer are also avoided.

A specific example of a pressure transducer embodying principles of the present invention is designed to operate over the barometric pressure range typically encountered at elevations from 1000 feet below sea level to 9000 feet above sea level. This would correspond to a pressure differential of 4.75 psi acting on the bellows. The bellows in response to such a pressure differential will possess a compression and expansion stroke of 0.200 inches. Linearity of a properly calibrated sensor can exhibit an accuracy of ±1% at room temperature.

While the preferred embodiment has been disclosed as a barometric pressure transducer, it will be appreciated that other uses of the invention are contemplated. By way of example, the device can be made into an absolute pressure transducer (i.e., such as might be used to measure engine manifold vacuum) by evacuating the bellows and then suitably sealing the housing and communicating the interior space around the bellows to the pressure which is to be sensed. In the disclosed embodiment ambient atmosphere is communicated to the interior of the housing via bore 42, its diameter being sized relative to that of core element 46 to provide clearance. Alternatively, it may be desired to close the right-hand end of the transducer and provide an alternate means of communicating pressure to the interior of the housing, for example by providing an opening, or a nipple, in end cap 26. With regard to evacuation of the bellows it should be noted that in the disclosed embodiment it will be necessary to slightly move cup 50 to the right from the position shown in FIG. 6 so that the left-hand wall of the cup does not block throughbore 66 at the right-hand end of fitting 54. Alternatively, it would be unnecessary to do this if additional passage structure is provided in fitting 54 to communicate throughbore 66 with the free interior space of the bellows which is to be evacuated. The example disclosed above represents only one specific design. Other designs embodying principles of the invention can be executed and in any given instance, the dimensions, characteristics etc. can be selected using conventional design formulas and calculations. For example, it was pointed out above that the ratio of thread 52a to thread 54a can be selected so that adjustment of the slope calibration can be made independently of the offset adjustment and this particular ratio can be calculated using conventional calculational techniques. The capability afforded by independent calibration means that both the offset calibration and the slope calibration can be made independently without one influencing the other. Thus, it can be seen that the invention provides a significant improvement in a pressure transducer, particularly one adapted for mass production usage.

In the claims:

1. In a pressure transducer having a housing within which is disposed a differential pressure sensing element whose axial length is a function of differential pressure applied to the element, the improvement comprising:
    means positioning one axial end of the sensing element at a selected location on the housing;
    means applying a spring force between the opposite axial end of the sensing element and another selected location on said housing such that axial expansion and contraction of the sensing element reacts with said spring force comprising a threaded fitting, a helical coil spring coaxial with said threaded fitting having one axial end threaded onto said threaded fitting; and
    calibration means effective to selectively set the relative threaded engagement of the coil spring and the fitting comprising means for relatively rotating the fitting and spring.

2. In a pressure transducer comprising a housing, an electrical circuit element on said housing adapted for connection in an external electrical circuit, another element which is positionable relative to said circuit element and is effective to cause an electrical characteristic of said circuit element to become a function of the position of said another element, an axially expansible and contractible bellows whose axial length is a function of the pressure differential between the interior and exterior thereof and whose expansion and contraction is effective to position said another element relative to said circuit element, the improvement comprising:
    means positioning one axial end of said bellows at a selected location on said housing;
    a threaded fitting;
    means mounting said threaded fitting on the opposite axial end of said bellows;
    a helical coil spring having one axial end thereof threaded onto the thread of said threaded fitting;
    means positioning the opposite axial end of said spring at another selected location on said housing such that axial expansion and contraction of said bellows reacts with said spring; and
    means connecting said opposite axial end of said bellows and said another element such that axial motion of said opposite axial end of said bellows positions said another element.

3. In the method of making a pressure transducer the steps of:
    providing a housing having a bore open at one axial end, keying structure at a selected axial location within the bore which permits passage of a correspondingly keyed element only when said element is properly circumferentially oriented within the bore relative to said keying structure;
    second keying structure at another selected location within the bore spaced axially between said first keying structure and the open end of the bore permitting passage of a correspondingly keyed element only when that element is properly circumferentially oriented with respect to said second keying structure;
    providing a pressure sensing mechanism for disposition within the bore of the housing having a pressure sensing element which expands and contracts in axial length in response to pressure differential applied to the sensing element, an axially expansible and contractible tension spring having one end thereof connected to one axial end of the pressure sensing element, a keyed element to which the opposite axial end of the tension spring is anchored and which only when properly circumferentially oriented relative to the first keying structure can pass axially with respect thereto, a second keyed element at the opposite axial end of the pressure sensing element which only when properly circumferentially oriented with respect to said second keying structure can pass axially with respect thereto; and then assembling the pressure sensing mechanism into the housing by:
    inserting the pressure sensing mechanism axially into the housing bore via the open end thereof by initially inserting the end of the mechanism having the first keyed element into the bore and then more fully inserting the mechanism far enough to pass each key axially beyond its corresponding keying structure;

rotating the mechanism to circumferentially dispose the first keyed element in a non-keyed orientation with respect to the corresponding keying structure but maintaining the second keyed element keyed with the second keying structure;

then extracting the assembly so that the first keyed element engages the corresponding keying structure in an interference relationship and continuing to extract the mechanism so that the spring is increasingly placed in tension as the extraction continues, continuing the extraction until the second keyed element clears the corresponding keying structure;

then rotating the second keyed element to a position where it is in non-keyed relationship with the corresponding keying structure and releasing the mechanism so that the tension force exerted by the spring draws the second keying element against the corresponding keying structure to thereby anchor both keyed elements within the housing and place both the sensing element and the tension spring in a state of tension.

4. In a pressure transducer comprising housing structure, an electrical circuit element on said housing structure adapted for connection in an external electrical circuit, another element which is positionable relative to said circuit element and is effective to cause an electrical characteristic of said circuit element to become a function of the position of said another element, an axially expansible and contractible bellows whose axial length is a function of the pressure differential between the interior and exterior thereof and whose expansion and contraction is effective to position said another element relative to said circuit element, and a helical tension spring with which said bellows reacts, the improvement comprising:

means connecting one axial end of said bellows to one axial end of said spring; and means positioning the opposite axial ends of both bellows and spring at selected locations on said housing structure which place both in a state of tension so that respective axial expansion and contraction of said bellows reacts with said spring to cause respective axial contraction and expansion of said spring.

5. In a pressure transducer comprising housing structure, an inductance coil on said housing structure adapted for connection in an external electrical circuit, a core which is positionable axially of said coil to vary the inductance thereof, an axially expansible and contractible element whose axial length is a function of the pressure differential between the interior and exterior thereof, a tension spring with which expansion and contraction of said element reacts, and a connection from said element to said core for selectively positioning said core in accordance with the pressure differential sensed by said element, the improvement characterized in that:

one axial end of said element is positioned at one selected location on said housing structure;

said tension spring is connected between the other axial end of said element and another selected location on said housing structure so as to place both element and spring in a state of tension whereby expansion and contraction of said element reacts with said spring;

said inductance coil is disposed axially of said housing structure on the side of said another selected location opposite said one selected location; and said connection connects said other axial end of said element and said core to selectively position said core relative to said coil in accordance with pressure differential sensed by said element.

6. In a pressure transducer comprising a housing, an electrical circuit element on said housing adapted for connection in an external electrical circuit, another element which is positionable relative to said circuit element and is effective to cause an electrical characteristic of said circuit element to become a function of the position of said another element, an axially expansible and contractible bellows whose axial length is a function of the pressure differential between the interior and exterior thereof and whose expansion and contraction is effective to position said another element relative to said circuit element, the improvement comprising:

means positioning one axial end of said bellows at a selected location on said housing;

a cup-shaped member nesting within and forming the closure for the opposite axial end of said bellows;

a threaded fitting disposed within and secured to said cup-shaped member;

a helical coil spring having one axial end thereof threaded onto the thread of said threaded fitting;

means positioning the opposite axial end of said spring at another selected location on said housing such that axial expansion and contraction of said bellows reacts with said spring; and means connecting said opposite axial end of said bellows and said another element such that axial motion of said opposite axial end of said bellows positions said another element.

* * * * *